(12) United States Patent
Igwemezie

(10) Patent No.: US 11,018,536 B2
(45) Date of Patent: May 25, 2021

(54) MAGNET MOTOR WITH ELECTROMAGNETIC DRIVE

(71) Applicant: Jude Igwemezie, Toronto (CA)

(72) Inventor: Jude Igwemezie, Toronto (CA)

(*) Notice: Subject to any disclaimer, the term of this patent is extended or adjusted under 35 U.S.C. 154(b) by 0 days.

(21) Appl. No.: 16/347,806

(22) PCT Filed: Oct. 25, 2017

(86) PCT No.: PCT/CA2017/051271
§ 371 (c)(1),
(2) Date: May 6, 2019

(87) PCT Pub. No.: WO2018/081892
PCT Pub. Date: May 11, 2018

(65) Prior Publication Data
US 2019/0260246 A1  Aug. 22, 2019

(30) Foreign Application Priority Data
Nov. 7, 2016  (CA) .................. CA 2947812

(51) Int. Cl.
| | |
|---|---|
| *H02K 1/27* | (2006.01) |
| *H02K 11/22* | (2016.01) |
| *H02K 9/06* | (2006.01) |
| *H02K 11/00* | (2016.01) |
| *H02K 11/028* | (2016.01) |

(Continued)

(52) U.S. Cl.
CPC .............. *H02K 1/2773* (2013.01); *H02K 1/27* (2013.01); *H02K 9/06* (2013.01); *H02K 11/0094* (2013.01); *H02K 11/028* (2013.01); *H02K 11/22* (2016.01); *H02K 16/00* (2013.01); *H02K 21/14* (2013.01); *H02K 21/22* (2013.01); *H02K 21/24* (2013.01);

(Continued)

(58) Field of Classification Search
CPC .......... H02K 1/14; H02K 1/27; H02K 1/2706; H02K 1/2713; H02K 1/272; H02K 1/274; H02K 1/2746; H02K 21/12; H02K 21/14; H02K 21/24
USPC ...... 310/156.01, 156.07, 156.32, 156.36–39, 310/156.43, 164, 179–180
See application file for complete search history.

(56) References Cited

U.S. PATENT DOCUMENTS

| | | | |
|---|---|---|---|
| 8,994,238 B2* | 3/2015 | Kamibayashi | H02K 7/116 310/152 |
| 2015/0137647 A1* | 5/2015 | Hunstable | H02K 21/22 310/156.43 |

(Continued)

*Primary Examiner* — Quyen P Leung
*Assistant Examiner* — Minki Chang
(74) *Attorney, Agent, or Firm* — Furr Law Firm; Jeffrey Furr, Esq.

(57) ABSTRACT

An electromagnetic rotating motor system that comprise of a grooved wheel with one or more permanent magnets tangentially embedded in a horse-shoe pattern within the groove around the wheel rim with similar poles pointing in the same direction and wherein induction coils or electromagnets are positioned to fit tangentially between the permanent magnet(s) in the groove with the pole axis of the electromagnet parallel to that of the permanent magnets and with the coiling and powering made such that it generates magnetic poles that are similarly aligned to the poles of the permanent magnets such that when current is passed through the coil, the poles of the electromagnet and the permanent magnet repel each other forcing the wheel holding the magnets to rotate away from the coil.

20 Claims, 5 Drawing Sheets

(51) Int. Cl.
*H02K 21/14* (2006.01)
*H02K 16/00* (2006.01)
*H02K 41/03* (2006.01)
*H02K 21/22* (2006.01)
*H02K 21/24* (2006.01)

(52) U.S. Cl.
CPC ....... *H02K 41/031* (2013.01); *H02K 2201/03* (2013.01)

(56) References Cited

U.S. PATENT DOCUMENTS

| | | | |
|---|---|---|---|
| 2016/0380496 A1* | 12/2016 | Hunstable | H02K 21/26 310/179 |
| 2018/0219464 A1* | 8/2018 | Newmark | H02K 21/24 |

* cited by examiner

MAGNET MOTOR WITH ELECTROMAGNETIC DRIVE

CROSS-REFERENCE TO RELATED APPLICATIONS

This application claims priority from Canadian patent application No. 2947812, entitled "Magnet Motor with Electromagnetic Drive", filed Nov. 7, 2016, which is hereby incorporated by reference in its entirety.

THE FIELD OF THE INVENTION

This invention relates to an electric motor. More particularly, the invention relates to scalable electric motor driven by interaction of permanent magnets with the magnetic flux outside electromagnetic coils.

BACKGROUND OF THE INVENTION

Current motors used for powering all types of mechanism have always been driven by external sources such as fossil fuel in the internal combustion engine, or electricity generated from hydro, nuclear energy, wind and solar sources etc. Numerous attempts have been made and continue to be made by various investigators to develop a motor that is driven by magnets. The objective being to harness the attracting and repelling properties of magnets to move or drive a mechanism that would cause linear or rotary motion. These prior attempts have had challenges that have included saturation of the magnetic field and magnetization of the metals holding the magnets or demagnetization of the magnets.

One prior art system relates to electromagnets each with an iron core arranged circumferentially around a disc with one pole pointing radially and permanent magnets arranged with their poles radially on a disc. As the permanent magnet approached the solenoid, it is attracted to the metal core. When the permanent magnet pole is radially aligned with that of the electromagnet pole, electric current is supplied to the electromagnet causing repulsion of the permanent magnet. The drawback to this prior art is the limited lateral displacement (throw) of the magnet when current is passed through the electromagnet. As a result, closely spaced coil are required to cause continuous rotation of the disc. This consumes more power and could lead to cross and/or mutual inductance issues between the electromagnets that would work against the rotation.

BRIEF SUMMARY OF THE INVENTION

The invention described herein is based on the magnetic fields outside of parallel-aligned permanent magnets and electromagnet solenoids with circular, elliptical or rectangular cross-section. Similar to what happens in solenoid-activated valves wherein the valve is inside the solenoid, the permanent magnets in this case partially encapsulates the solenoid and vice versa. The permanent magnets are arranged at discrete intervals with their axis tangential to the outer perimeter of a disc and transversely to partially encapsulate a stationary electromagnet as they fly by or with electromagnets arranged in a horseshoe pattern to partially encapsulate permanent magnets arranged tangentially and placed near the rim of the disc and around the disc as the disc mounted permanent magnets fly by. The case wherein the magnet surrounds the electromagnet will consume lesser energy than the other way around. The electromagnet and magnet groups can be discrete with similar poles pointing in the same direction and aligned in a parallel manner. Shielding material can be placed between the permanent magnets on the rotating disc to force the magnetic field in each individual magnet to curl back from the North to the South Pole rather than connect to the opposite pole of an adjacent magnet. Current is supplied to each electromagnet when it is aligned parallel with a permanent magnet to repel the permanent magnet in the same direction and cause the wheel to continuously rotate.

An example embodiment is an electromagnetic rotating motor system that comprise of a grooved wheel with one or more permanent magnets tangentially embedded in a horseshoe pattern within the groove around the wheel rim with similar poles pointing in the same direction and wherein induction coils or electromagnets are positioned to fit tangentially between the permanent magnet(s) in the groove with the pole axis of the electromagnet parallel to that of the permanent magnets and with the coiling and powering made such that it generates magnetic poles that are similarly aligned to the poles of the permanent magnets such that when current is passed through the coil, the poles of the electromagnet and the permanent magnet repel each other forcing the wheel holding the magnets to rotate away from the coil.

By having several permanent magnets and electromagnet coils positioned around the circumference of the wheel, the electromagnet coils can be alternately powered to create a relay of forces on the permanent magnets arranged circumferentially on the wheel, thereby continuously rotating the wheel. A reverse version of the motor can utilize multiple coils aligned in a horse-shoe pattern partially surrounding a single magnet to repel the single magnet placed to lie tangentially near the rim of a disc and positioned with the poles parallel to the poles of the coils, again causing the disc to rotate.

An example embodiment is an electric motor, comprising: a disc having a circumference, a central shaft for the disc to rotate about, at least one permanent magnet mounted at the circumference of the disc, each of the at least one permanent magnet having a north pole and a south pole along a longitudinal axis pointing from the south pole to the north pole; a controllable power supply; and at least one electromagnet, each of the at least one electromagnet disposed circumferentially adjacent to the disc, an electromagnet north pole and an electromagnet south pole are generated upon receiving electricity from the power supply, an electromagnet longitudinal axis pointing from the electromagnet south pole to the electromagnet north pole and pointing to a same circumferential direction as the longitudinal axis from the south pole to the north pole of the at least one permanent magnet.

DETAILED DESCRIPTION OF THE PREFERRED EMBODIMENTS

In the following descriptions, the same number delineated by lower case alphabets are used to describe items that look different but perform similar functions. The letter "N" means the North Pole and letter "S" means the South Pole of permanent and/or electro-magnets.

An exemplary description of how the invention works follows, with reference to FIGS. 1-7.

Figure 1:
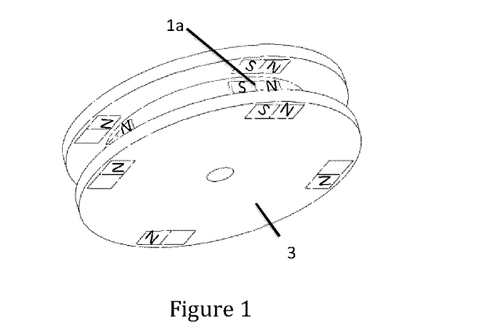
FIG. 1 is a single grooved disc of this invention wherein discrete rectangular permanent magnets are circumferentially embedded in a horseshoe manner in the hub and flanges of the disc with their axis tangential to the rims of the disc flange and disc hub.
Figure 2:
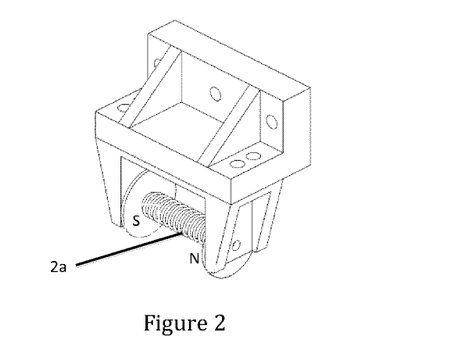
FIG. 2 is an electromagnet solenoid of this invention attached to a possible mounting arm.
Figure 3:
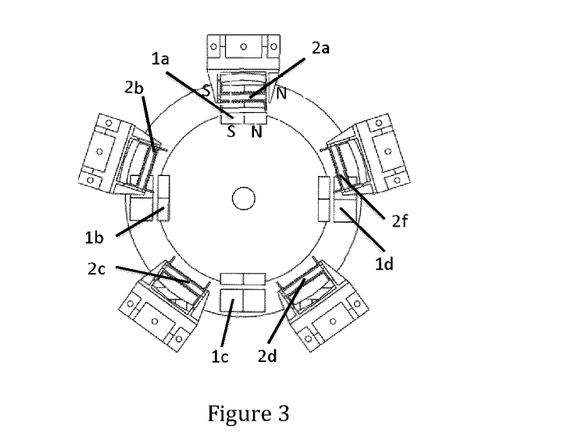
FIG. 3 is a transverse section view of a single disc and electromagnet of this invention showing how the two magnet types are mounted and positioned.
Figure 4:
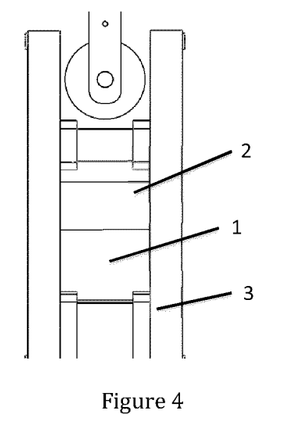
FIG. 4 is an end view of the motor of this invention showing the electromagnet is positioned inside the groove of the disc but not touching the disc.
Figure 5:
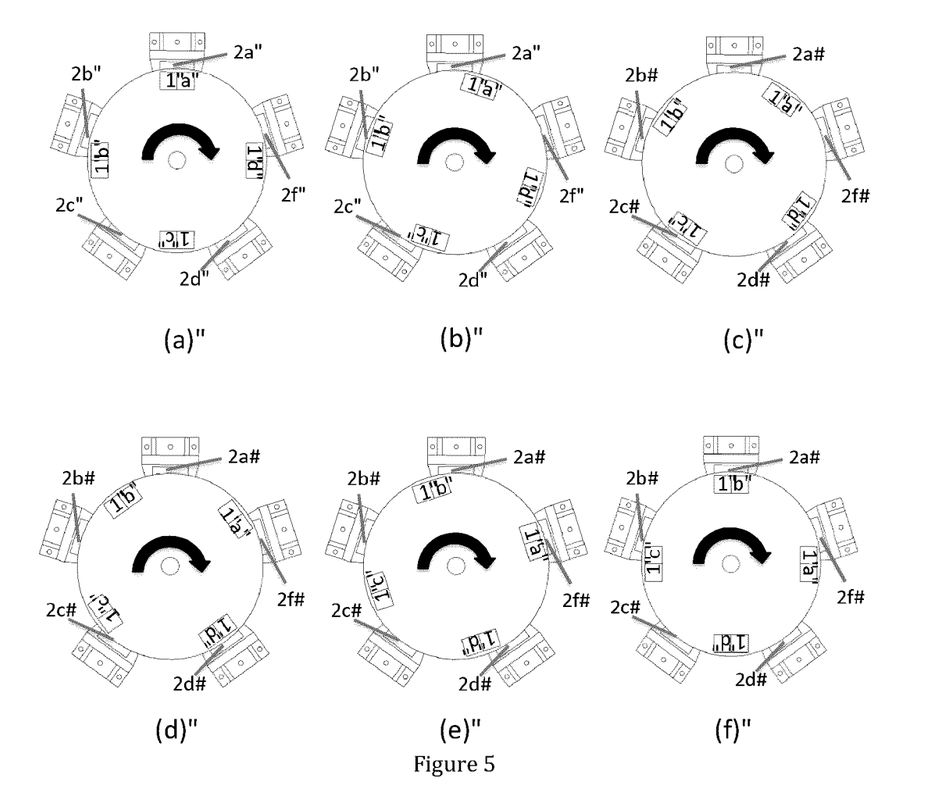
FIG. 5 at a, b, c, d, e and f show the rotational interaction of the electromagnet with the permanent magnet in the motor of this invention.
Figure 6:
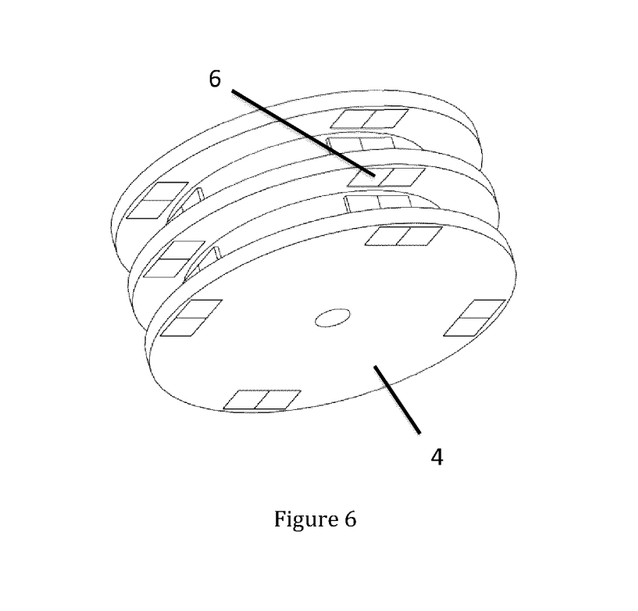
FIG. 6 is a double grooved disc of this invention wherein permanent magnets are circumferentially embedded in the hub and flanges of the disc with their axis tangential to the rims of the wheel flange and wheel hub.
Figure 7:
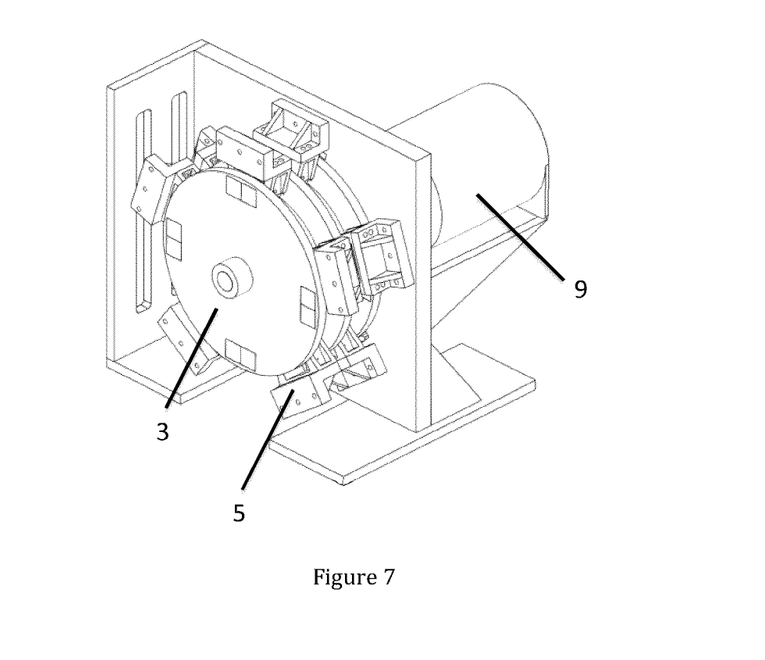
FIG. 7 is a double grooved wheel of this invention wherein electromagnets are placed inside the grooves of the wheel and the shaft of the wheel connected to a generator head.
Figure 8:
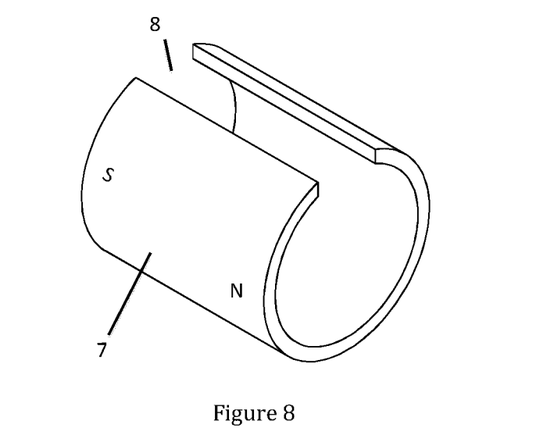
FIG. 8 is a "C" shaped permanent magnet used in a variant of this invention with the poles shown.
Figure 9:
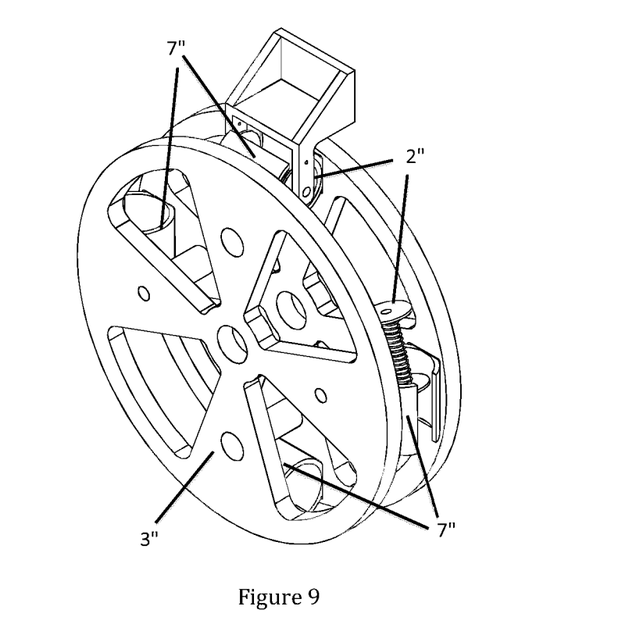
FIG. 9 is an isometric view of the variant of this invention showing the interaction of the electromagnet with the "C" shaped permanent magnet.
Figure 10:
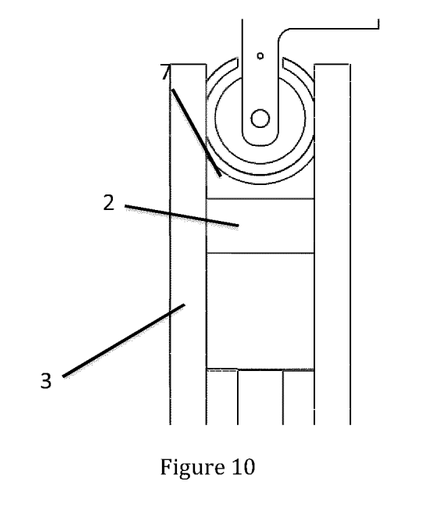
FIG. 10 is an end view of the variant of this invention wherein the electromagnet is in perfect alignment inside the "C" permanent magnet but not touching the magnet.

Starting with single grooved disc (3) with permanent magnets (1a, 1b, 1c, 1d) arranged in a horseshoe manner and parallel to and aligned with all the poles pointing the same way circumferentially and electromagnetic solenoid (2a, 2b, 2c, 2d, 2f) aligned such that when current is passed through each, the electromagnetic pole induced is parallel to and pointed in a similar direction as that of the permanent magnets (1). When current is applied to electromagnet (2a), the induced magnetic field will cause the permanent magnet (1a) to displace and rotate laterally clockwise bringing permanent magnet group (1b) into parallel alignment with electromagnet solenoid (2b). The current to electromagnet (2a) is then switched off after the permanent magnet group (1a) has rotated away from it and power supplied to electromagnet (2b) when permanent magnet group (2b) is in parallel alignment with electromagnet (2b). This causes further lateral and rotational clockwise displacement of permanent magnet (1b) bringing permanent magnet (1c) into alignment with electromagnet (2c) and so on. The electromagnet (2) spacing is such as to produce a relay type handover action of the permanent magnets as current is alternately supplied to the electromagnets (2) causing the disc to continuously rotate. In an embodiment, the permanent magnets (1) in a horseshoe arrangement partially surround the electromagnet (2) to maximize interaction of the permanent magnets (1) with the flux emanating from electromagnet (2) while minimizing the power spent on the electromagnets (2) as well as eliminate issues related to mutual and cross inductance of electromagnets in close proximity to one another. The torque produced by the disc (3) rotation is dependent on the diameter of the disc (3). Similarly, the number of permanent magnets (1) and electromagnets (2) used around the rim of the disc (3) is also dependent on the diameter of the disc (3). By partially surrounding the electromagnet (2) with a horseshoe arrangement of permanent magnets (1), a good percentage of the magnetic flux outside the electromagnet (2) is harnessed to propel the permanent magnets (1) laterally and rotate the disc (3). Positioning the permanent magnets (1) near the rim of the disc (3) increases the rotational inertia of the disc (3), a good attribute in sustaining the disc (3) rotation. The shaft of the disc (3) is then connected to the shaft of another machine for providing rotation.

The electromagnet (2) and permanent magnet groups (1) can be discrete with similar poles pointing in the same direction and aligned in a parallel manner and tangential to the rim of disc (3). Shielding material can be placed between the permanent magnets (1) on the rotating disc (3) to force the magnetic field in each individual permanent magnet (1) to curl back from the North to the South Pole rather than connect to the opposing pole of an adjacent permanent magnet.

Referring to FIGS. 8-11, a variant of the invention utilizes a "C" shaped permanent magnet (7) with the North and South poles aligned longitudinally as indicated. The permanent magnet (7) is tangentially embedded near the rim of the disc (3) and (4). This way, the permanent magnet (7) covers as much magnetic flux from the electromagnet (2) as possible. The longitudinal cut out (8) of the permanent magnet (7) accommodates the arm holding the electromagnet solenoid (2) as the permanent magnets (7) fly by.

The motor of this invention can be started by manual rotation of the disc (3, 4) or with the aid of a DC battery.

Figure 11:
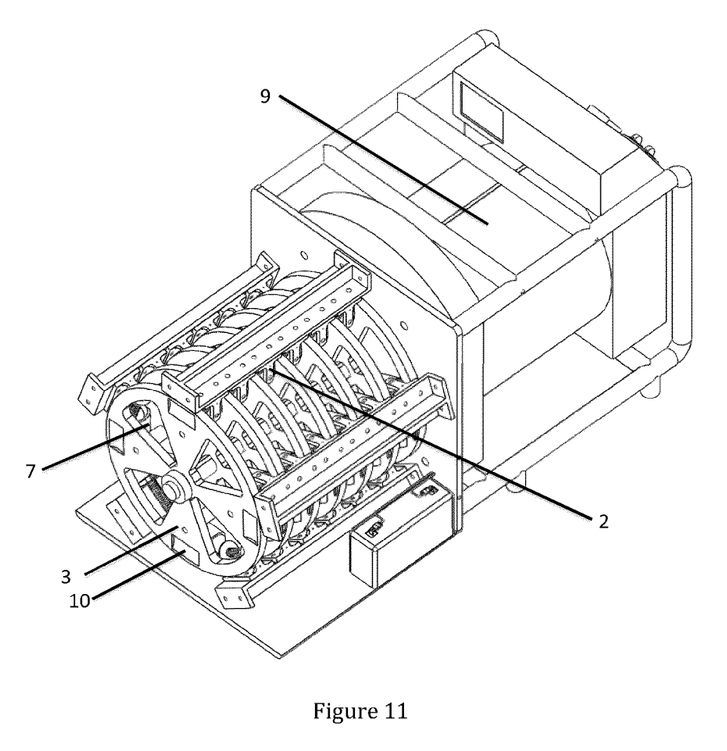
FIG. 11 is an isometric view of the variant of this invention wherein several discs are arranged with "C" permanent magnet sandwiched between them and electromagnets positioned inline to pass inside the "C" permanent magnet with the entire assembly driving a generator head to produce electricity.

Additional rotational torque can be provided with the use of multiple layers of discs (3) with indentations (10) on either sides that position and retain the permanent "C" magnets (7) to form a multiple grooved drum with electromagnets (2) arranged in line between the grooves and passing between the cut out of the permanent "C" magnet (7) positioned between the flanges as the drum rotates. Rotation is induced when electric current is passed through the line of electromagnets (2), which are repelled by permanent "C" magnets (7) to cause rotation which then drives a generator head (9) or alternator to produce electricity. Alternatively, a "U" shaped permanent magnet can be used with rectangular solenoids to increase the coverage of the magnetic field on the electromagnet.

Example Features to this Invention may Include:
1. Parallel interaction of the flux field outside a permanent magnet and flux field outside an electromagnet is used to produce more lateral displacement of the permanent magnet and thus more disc rotation per unit length of permanent magnet and electromagnet.
2. Partial encapsulation of the electromagnet by the passing permanent magnets maximizes the interaction between the fields of both magnet types.
3. The simultaneous action of one solenoid on several permanent magnets arranged in a horseshoe manner to partially surround the solenoid produces more rotational force per unit electromagnet energy spent.
4. Positioning the magnets near the rim of the disc produce more rotational inertia once the system starts rotating.
5. Increasing the diameter of the disc while maintaining the same electromagnetic force between the electromagnets and the permanent magnets will increase torque and produce more power for the same electromagnet energy spent.
6. Multiple grooved discs equipped with permanent magnets and stacked together to form a drum interacting with lines of electromagnets will produce more torque and power.
7. Due to the rotational energy in the system, minimal electromagnet energy is required to sustain the motor rotation once high rpms are achieved.
8. Additionally, several passive electromagnets can be placed around the rim of the disc to generate electricity from the passage of the magnets.
9. The energy fields outside of permanent magnets and electromagnets internally drive the motor with no fossil fuel and consequent pollution.
10. The motor has non-contacting stationary electromagnetic parts with rotating disc and permanent magnets, which eliminates the need for replacement parts due to wear and tear.
11. The motor is easy to manufacture and assemble, and can be scaled.

An example embodiment is an electric motor, comprising: a disc having a circumference, a central shaft for the disc to rotate about, at least one permanent magnet mounted at the circumference of the disc, each of the at least one permanent magnet having a north pole and a south pole along a longitudinal axis pointing from the south pole to the north pole; a controllable power supply; and at least one electromagnet, each of the at least one electromagnet disposed circumferentially adjacent to the disc, an electromagnet north pole and an electromagnet south pole are generated upon receiving electricity from the power supply, an electromagnet longitudinal axis pointing from the electromagnet south pole to the electromagnet north pole and pointing to a same circumferential direction as the longitudinal axis from the south pole to the north pole of the at least one permanent magnet.

In an example embodiment of any of the above-described motor, wherein the at least one permanent magnet includes at least two permanent magnets, and the permanent magnets are configured to be disposed on the disc such that the longitudinal axes pointing from the south pole to the north pole to the same circumferential direction.

In an example embodiment of any of the above-described electric motor, further comprising a shielding material disposed between each of the at least two permanent magnets.

In an example embodiment of any of the above-described electric motor, wherein: the electricity is cut off from each of the at least one electromagnet when that electromagnet is circumferentially offset from one of the at least one permanent magnet or beyond a circumferential threshold of being circumferentially aligned, and the electricity is supplied to the at least one electromagnet when the electromagnet axis is substantially circumferentially aligned with the axis of at least one of the at least one permanent magnet or within another circumferential threshold of being circumferentially aligned.

In an example embodiment of any of the above-described electric motor, wherein the longitudinal axis of the at least one permanent magnet and the electromagnet longitudinal axis of the at least one electromagnet are parallel but on different planes when the electromagnet axis is substantially circumferentially aligned with the axis of the at least one of the at least one permanent magnet.

In an example embodiment of any of the above-described electric motor, wherein the at least one permanent magnet defines a channel, the channel extending along the longitudinal axis.

In an example embodiment of any of the above-described electric motor, wherein the electromagnet is disposed within the channel when circumferentially aligned.

In an example embodiment of any of the above-described electric motor, wherein a cross-section of the channel is "C"-shaped.

In an example embodiment of any of the above-described electric motor, wherein a cross-section of the channel is horseshoe-shaped.

In an example embodiment of any of the above-described electric motor, wherein the at least one electromagnet is rectangular.

In an example embodiment of any of the above-described electric motor, wherein for the at least one permanent magnet, the cross-section is perpendicular relative to the longitudinal axis.

In an example embodiment of any of the above-described electric motor, wherein the channel defines a central longitudinal axis, wherein the central longitudinal axis and the electromagnet longitudinal axis are on the same plane.

In an example embodiment of any of the above-described electric motor, wherein the at least one electromagnet defines an electromagnet channel, the electromagnet channel extending along the electromagnet longitudinal axis.

In an example embodiment of any of the above-described electric motor, wherein the at least one of the permanent magnets is disposed within the electromagnet channel when the at least one permanent magnet and the at least one electromagnet are circumferentially aligned.

In an example embodiment of any of the above-described electric motor, wherein the electromagnet channel defines a central electromagnet longitudinal axis, wherein the central electromagnet longitudinal axis and the electromagnet longitudinal axis are on the same plane.

In an example embodiment of any of the above-described electric motor, wherein the longitudinal axes of the permanent magnets are tangential to the circumference of the disc.

In an example embodiment of any of the above-described electric motor, further comprising at least one fixed support for supporting the at least one electromagnet.

In an example embodiment of any of the above-described electric motor, wherein the electromagnet longitudinal axis is tangential to the disc.

In an example embodiment of any of the above-described electric motor, wherein the at least one electromagnet comprises a solid soft iron core integral with flanges or end washers.

In an example embodiment of any of the above-described electric motor, further comprising an optical and/or one or more proximity sensors for detecting the alignment of the permanent magnets and the at least one electromagnet.

In an example embodiment of any of the above-described electric motor, wherein for each of the permanent magnets a flux field is generated, the electromagnet generates a electromagnet flux field upon receiving the electricity, and the flux field and the electromagnet flux field interact to produces lateral displacement of the permanent magnet relative to the electromagnet, thereby causing disc rotation.

In an example embodiment of any of the above-described electric motor, wherein the power supply is a battery.

In an example embodiment of any of the above-described electric motor, further comprising speed controllers for regulating rotational speed of the disc.

In an example embodiment of any of the above-described electric motor, further comprising fan vanes attached to the disc for cooling the at least one electromagnet.

In an example embodiment of any of the above-described electric motor, wherein each electromagnet comprises a solenoid.

In an example embodiment of any of the above-described electric motor, wherein the at least one electromagnet includes at least two electromagnets, wherein the electricity is supplied to the at least two electromagnets in a sequential order such that the disc rotates.

In an example embodiment of any of the above-described electric motor, wherein while the electricity is supplied to some of the at least two electromagnets to repel the permanent magnets, the other of the at least two electromagnets are attracted into position.

In an example embodiment of any of the above-described electric motor, wherein the permanent magnets curve to generally correspond to the circumference of the disc.

In an example embodiment of any of the above-described electric motor, wherein the discs share the central shaft.

An example embodiment is an electricity generating system comprising at least one passive electromagnet disposed circumferentially adjacent to the disc of any one of the above-described electric motor for generating electricity from the passage of the at least one permanent magnet.

In an example embodiment of the electricity generating system, wherein the system is configured to drive a generator.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features, which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. An electric motor, comprising:
a disc having a circumference;
a central shaft for the disc to rotate about;
at least two permanent magnets mounted at the circumference of the disc, wherein
each of the at least two permanent magnets has a north pole and a south pole along a longitudinal axis pointing from the south pole to the north pole, and defines a channel, the channel extending along the longitudinal axis, a cross-section of each of the at least two permanent magnets, perpendicular to the longitudinal axis, is curved around the channel, and
the pointing of the longitudinal axes of all of the permanent magnets mounted at the circumference of the disc point from the south pole to the north pole in a same circumferential direction;
a controllable power supply; and
at least two electromagnets, each of the at least two electromagnets comprising a solenoid, wherein
the at least two electromagnets are disposed circumferentially adjacent to the disc,
for each of the at least two electromagnets, an electromagnet north pole and an electromagnet south pole are generated upon receiving electricity from the power supply,
an electromagnet longitudinal axis pointing from the electromagnet south pole to the electromagnet north pole for all of the electromagnets points in the same circumferential direction as the pointing of the longitudinal axes of the at least two permanent magnets;
wherein when the electromagnet longitudinal axis of one of the at least two electromagnets is substantially circumferentially aligned with the longitudinal axis of one of the at least two permanent magnets, the electromagnet longitudinal axis of the one of the at least two electromagnets and the longitudinal axis of the one of the at least two permanent magnets are parallel, and the one of the at least two electromagnets is disposed within the channel of the one of the at least two permanent magnets; and
wherein
the electricity from the power supply is off to one of the at least two electromagnets when the one of the at least two electromagnets is circumferentially offset from one of the at least two permanent magnets, and
the electricity from the power supply is supplied to the one of the at least two electromagnets when the electromagnet longitudinal axis of the one of the at least two electromagnets is substantially circumferentially aligned with the longitudinal axis of the one of the at least two permanent magnets or within a circumferential threshold of being circumferentially aligned.

2. The electric motor of claim 1, further comprising a shielding material disposed between each of the at least two permanent magnets.

3. The electric motor of claim 1, wherein the cross-section of each of the at least two permanent magnets is "C"-shaped.

4. The electric motor of claim 1, wherein the cross-section of each of the at least two permanent magnets is horseshoe-shaped.

5. The electric motor of claim 1, wherein a respective cross-section of each of the at least two electromagnets, perpendicular to the longitudinal axis, is circular or rectangular.

6. The electric motor of claim 1, wherein the channel defines a central longitudinal axis, and wherein the central longitudinal axis and the electromagnet longitudinal axis are on a same plane.

7. The electric motor of claim 1, wherein the longitudinal axes of the at least two permanent magnets are tangential to the circumference of the disc.

8. The electric motor of claim 1, further comprising at least one fixed support for supporting the at least two electromagnets.

9. The electric motor of claim 1, wherein the electromagnet longitudinal axis of each of the at least two electromagnets is tangential to the disc.

10. The electric motor of claim 1, wherein each of the at least two electromagnets comprises a solid soft iron core integral with flanges or end washers.

11. The electric motor of claim 1, further comprising an optical and/or one or more proximity sensors for detecting the alignment of the at least two permanent magnets and the at least two electromagnets.

12. The electric motor of claim 1, wherein each of the at least two permanent magnets generates a flux field, and at least one of the at least two electromagnets generates a electromagnet flux field upon receiving the electricity, and the flux field and the electromagnet flux field interact to produce lateral displacement of the permanent magnets relative to the at least one of the at least two electromagnets, thereby causing disc rotation.

13. The electric motor of claim 1, wherein the power supply is a battery.

14. The electric motor of claim 1, further comprising speed controllers for regulating rotational speed of the disc.

15. The electric motor of claim 1, further comprising fan vanes attached to the disc for cooling the at least two electromagnets.

16. The electric motor of claim 1, wherein the electricity is supplied to the at least two electromagnets in a sequential order such that the disc rotates.

17. The electric motor of claim 1, wherein while the electricity is supplied, one of the at least two electromagnets repels one of the at least two permanent magnets, and another of the at least two electromagnets attracts the one of the at least two permanent magnets in a relay handover action.

18. The electric motor of claim 1, wherein each of the at least two permanent magnets curve to generally correspond to the circumference of the disc.

19. The electric motor of claim 1, wherein a number of the at least two permanent magnets is different than a number of the at least two electromagnets.

20. An electric motor, comprising:
a disc having a circumference;
a central shaft for the disc to rotate about;
at least two permanent magnets mounted at the circumference of the disc, wherein
each of the at least two permanent magnets has a north pole and a south pole along a longitudinal axis pointing from the south pole to the north pole, and
the pointing of the longitudinal axes of all of the permanent magnets mounted at the circumference of the disc point from the south pole to the north pole in a same circumferential direction;
a controllable power supply; and
at least two electromagnets, each of the at least two electromagnets comprising a solenoid having a solid soft iron core with flanges or end washers at both ends of the solenoid, wherein
the at least two electromagnets are disposed circumferentially adjacent to the disc,
for each of the at least two electromagnets, an electromagnet north pole and an electromagnet south pole are generated upon receiving electricity from the power supply,
an electromagnet longitudinal axis pointing from the electromagnet south pole to the electromagnet north pole for all of the electromagnets points in the same circumferential direction as the pointing of the longitudinal axes of the at least two permanent magnets, and
each of the at least two electromagnets defines a channel, the channel
extending along the electromagnet longitudinal axis, a cross-section of each of the at least two electromagnets, perpendicular to the longitudinal axis, is curved around the channel;
wherein when the electromagnet longitudinal axis of one of the at least two electromagnets is substantially circumferentially aligned with the longitudinal axis of one of the at least two permanent magnets, the electromagnet longitudinal axis of the one of the at least two electromagnets and the longitudinal axis of the one of the at least two permanent magnets are parallel, and the one of the at least two permanent magnets is disposed within the channel of the one of the at least two electromagnets; and
wherein
the electricity from the power supply is off from one of the at least two electromagnets when the one of the at least two electromagnets is circumferentially offset from one of the at least two permanent magnets, and
the electricity from the power supply is supplied to the one of the at least two electromagnets when the electromagnet longitudinal axis of the one of the at least two electromagnets is substantially circumferentially aligned with the longitudinal axis of the one of the at least two permanent magnets or within a circumferential threshold of being circumferentially aligned.

* * * * *